3,305,587
DEHYDROGENATION OF CYCLOALKANOLS
Heinrich Sperbert and Guenter Poehler, Ludwigshafen (Rhine), and Otto Goehre, Heidelberg, Germany, assignors to Badische Anilin- & Soda-Fabrik Aktiengesellschaft, Ludwigshafen (Rhine), Germany
No Drawing. Filed Dec. 16, 1963, Ser. No. 330,653
Claims priority, application Germany, Dec. 18, 1962, B 70,020
8 Claims. (Cl. 260—586)

This invention relates to a new method of dehydrogenating cycloalkanols.

It is known that primary or secondary alcohols can be dehydrogenated to aldehydes or ketones in contact in the gas phase with solid catalysts at elevated temperature. Among the prior art dehydrogenation catalysts, zinc oxide has acquired particular technical importance.

It is expected of a good catalyst that it will cause substantial conversion even at high loading and that it will be as specific as possible, i.e. side reactions and secondary reactions are suppressed. Dehydration with the formation of olefins is a particularly undesirable side reaction. A troublesome secondary reaction is the formation of high boiling point condensation products from the carbonyl compounds. It is moreover desirable that the catalysts should make possible long operating periods and should be easily regeneratable.

Zinc oxide catalysts hitherto recommended are not satisfactory in every respect. A catalyst is described in German patent specification No. 809,437 which is prepared by impregnating pumice with a zinc salt solution, drying the impregnated pumice and annealing it at definite temperatures rising to 600° C. This catalyst has a specific action, at least initially, and gives a satisfactory conversion provided low throughputs, for example 0.2 kg. of alcohol per hour per liter of catalyst, are tolerable. If the catalyst is loaded however with for example 1 kg. of alcohol per liter of catalyst per hour, the initial material remains substantially unreacted. Moreover high boiling point condensation products form to an increasing extent after only a short time, so that the catalyst has to be regenerated frequently.

According to French patent specification No. 906,148 a zinc oxide is used which contains a small amount of an alkali metal salt or alkaline earth metal salt of a mineral acid and if desired a difficultly reducible metal oxide and which is annealed prior to use. Conversions of up to 90% are achieved at throughputs of about 0.5 kg. of initial material per liter of catalyst per hour. However, appreciable amounts of high molecular weight condensation products are formed, for example 3.3% from cyclohexanol.

A catalyst is described in German patent specification No. 919,227 which is obtained by impregnating pumice with a zinc salt solution, predrying the impregnated pumice at about 200° C., and heating it to 600° to 1000° C., especially to 800° C. Apart from the fact that such supported catalysts have only relatively low throughputs, they are not sufficiently active and specific. This is probably attributable to the fact that these catalysts are heated immediately to temperatures of 600° to 1000° C. without annealing at temperatures between 200° and 600° C. It is therefore necessary to carry out the dehydrogenation at relatively high temperature and this of course favours condensation reactions and deposition on the catalyst in the case of higher secondary alcohols. The catalyst must therefore be regenerated often. Even in the dehydrogenation of isopropanol, which proceeds particularly smoothly, a regeneration of the catalyst is recommended after only five weeks.

It is an object of the invention to provide a process for dehydrogenating cycloalkanols with the use of zinc oxide dehydrogenation catalysts which effect substantial conversion even at high loadings. Another object of the invention is to provide a process using zinc oxide dehydrogenation catalysts which are highly specific, i.e. which suppress side reactions and secondary reactions. A further object of the invention is to provide a process which uses a zinc oxide dehydrogenation catalyst having a long life and being easy to regenerate.

In accordance with this invention the said objects and advantages are achieved by dehydrogenation of cycloalkanols having six to twelve carbon atoms at 250° to 450° C. in the gas phase in contact with catalysts consisting substantially of zinc oxide and which have been obtained by reciprocating an aqueous zinc salt solution with a basic precipitant, separating the precipitate from the aqueous phase, heating it within at least two hours to about 400° C. and annealing it for two to ten hours at a temperature between 400° and 600° C., the time and temperature being correlated so that a zinc oxide is formed which has a surface of 5 to 20 m.$^2$/g. Zinc oxide having a surface of 8 to 16 m.$^2$/g. is especially preferred.

The process according to this invention gives high yields even when the throughputs are high, for example 1 kg. of initial material per liter of catalyst per hour. Less condensation products than in the prior art methods (for example always less than 2% in the case of cyclohexanol) are formed owing to the high activity of the catalysts and the lower reaction temperatures thus made possible, particularly at the beginning of the reaction period. Olefin formation is not observed to an appreciable extent. The low reaction temperatures probably also explain the long operating periods between regenerations, these periods being as a rule more than one year.

The process is particularly suitable for the dehydrogenation of cycloalkanols having six to twelve carbon atoms, such as cyclohexanol, 4-methylcyclohexanol, cyclooctanol and cyclododecanol. For example excellent results are obtained in the dehydrogenation of cyclohexanol which has been obtained by the processes of U.S. Patent 2,938,924; U.S. patent application Serial No. 75,732, filed December 14, 1960, by Guenter Poehler, Hans Joachim Waldmann and Hubert Corr; and U.S. patent application Serial No. 107,017, filed May 2, 1961, by Hans Joachim Waldmann and Herwig Hoffmann. In many cases the cycloalkanols need not be pure but may contain inert impurities.

It is important that the catalyst should consist mainly or substantially, i.e. at least 80% by weight, of zinc oxide because supported catalysts do not permit such high conversions and moreover cause the formation of high boiling condensation products to an increasing extent after some time. For these reasons, inert carriers, such as pumice or other silicate or oxide materials should be present only in insignificant amounts, i.e. up to 20% by weight, and should not constitute a substantial component of the catalyst. Conventional additives in zinc oxide catalysts, such as copper compounds, alkali metal salts or alkaline earth metal salts of mineral acids, compounds of the rare earths or difficulty reducible oxides, may also be present in minor amounts  It is the specified surface properties of the zinc oxide which constitute an essential feature of the invention, not specific additives.

Another essential feature is that the starting materials for the production of the catalysts are zinc compounds which have been obtained from aqueous zinc salt solutions by precipitation by means of a basic precipitant, i.e. an alkali metal hydroxide, alkaline earth metal hydroxide, alkali metal carbonate or alkali metal hydrogen carbonate or the equivalent ammonium compounds and which are converted into zinc oxide by heating. For example aqueous solutions of zinc chloride, zinc sulfate, zinc nitrate, zinc formate, zinc acetate, zinc dithionite or a zinc salt of a hydroxyalkanesulfinic acid, for example hydroxymethanesulfinic acid, may be precipitated by adding caustic soda solution, caustic potash solution, or ammonia (in stoichiometric amounts), sodium carbonate, sodium hydrogen carbonate or potassium carbonate, advantageously dissolved or suspended in water. The zinc compound may also be produced by passing carbon dioxide or another acid into an alkali metal zincate solution. In this case the precipitate is produced by alkali metal hydroxide and alkali metal carbonate. The said zinc compounds are zinc hydroxide or a water-insoluble salt which is thermally decomposable to zinc oxide, i.e. zinc carbonate, basic zinc carbonate or zinc hydrogen carbonate.

Catalysts having the desired surface are obtained from the zinc compounds by a definite thermal treatment. The precipitated zinc compound is first separated mechanically from the aqueous phase, i.e. filtered off, centrifuged off or pressed off, and advantageously washed with water. The moist material is advantageously formed into suitable shapes, for example pellets or strands, if desired with an addition of water and advantageously after adding about 0.5 to 10% by weight of a binding agent, such as starch, graphite or stearic acid. The shaped pieces are heated to about 400° C., the water thus being removed and the annealing step initiated. The increase in temperature should take at least two hours and especially from three to twenty hours. It is advantageous to remove the steam from the catalyst zone by means of an inert gas stream. Hydrogen, nitrogen or carbon dioxide or preferably air are suitable for the purpose. The water vapor content of the gas leaving the catalyst zone should be less than 50%, advantageously less than 40%, of the saturation value after cooling to 40° C. The steam formed is thus removed rapidly by the inert gas stream. It is advantageous to pass the gas over the catalyst material at a velocity of more than 0.2 m./sec., for example 0.5 to 2 m./sec. The gas may be previously passed through a drying plant, for example through silica gel, so that its water vapor content at 40° C. is less than 20% of the saturation value.

It may sometimes be advantageous to dry the said shaped pieces at 100° to 150° C. in an inert gas stream for some time, e.g., 4 to 24 hours, prior to increasing the temperature to 400° C.

The catalyst is then annealed at a temperature of more than 400° C. It is essential to correlate the conditions, especially temperature and duration of treatment, so that the catalyst has the desired surface. It is best to work at 400° to 600° C., advantageously at 450° to 600° C., and to heat the catalyst for two to ten hours. The shorter treatment periods are suitable for the higher temperatures and vice versa. If the annealing is carried out in a gas current, advantageously in an air current, the treatment period required is shorter. At a temperature of 500° to 600° C., a period of three to seven hours is usually sufficient. The treatment in a current of air is especially favorable in the case of shaped zinc hydroxide containing an organic binding agent. If the annealing temperature is too low and/or the treatment period too short, catalysts are obtained having too large a surface, for example 25 to 30 m.$^2$/g. Such large-surfaced catalysts may form up to 20% of high boiling point condensation products. Conversely, catalysts which have been heated to too high a temperature and/or for too long a period are not effective at temperatures less than 50° C. higher, permit only lower throughputs and subside relatively rapidly in their activity so that frequent regeneration is necessary. It is only catalysts having surfaces between 5 and 20 m.$^2$/g. which give the excellent results described above. For example in the dehydrogenation of cyclohexanol at throughputs of 1 kg. per liter of catalyst per hour, a conversion of at least 80% is maintained for more than a year and the proportion of unsaturated hydrocarbons does not exceed 0.5% and that of high boiling point condensation products does not exceed 2%.

The conversion may even be increased a little more and the formation of hydrocarbons and/or condensation products further suppressed if the catalyst, after annealing, is heated in a hydrogen atmosphere, for example for two to ten hours at a temperature between 300° and 500° C.

The process according to this invention is advantageously carried out at a temperature between 250° and 450° C., especially between 310° and 400° C., and as a rule at atmospheric pressure. It is usual to begin at 310° to 340° C. and to raise the temperature if the activity of the catalyst subsides in the course of some months, for example by about 20° to 60° C. When the yield declines, the catalyst is regenerated. The most favorable temperature within the said range depends not only on the alcohol to be dehydrogenated but also on whether additives are co-employed or not. For example the temperature is generally lower when about 1 to 20% of a copper compound is added, for example as oxide, hydroxide, carbonate or nitrate. Regeneration of the catalyst is also facilitated by such an addition. Compounds of the alkaline earths and rare earths have also proved to be favorable.

In the new process, throughputs between 0.3 and 5, particularly between 0.4 and 2 kg. of initial material per liter of catalyst per hour are generally used. At the said temperatures a degree of conversion of between 80 and 90% can be achieved without difficulty.

The catalyst may be rigidly arranged in the reactor. It may however also be fluidized or may migrate through the reactor as a moving bed.

When the falling off of the activity of the catalyst can no longer be compensated for by a rise in temperature, the catalyst may be regenerated several times. This is most simply effected by heating it to 200° to 400° C. and passing air over it for some time, for example four to ten hours. After this treatment, the catalyst has practically regained its original efficiency.

The invention is further illustrated by the following examples.

Example 1

A 5% by weight aqueous zinc chloride solution is precipitated with an equivalent amount of 25% caustic soda solution. The precipitated zinc hydroxide is filtered off, made into a paste with a starch solution and the material made into pellets having a diameter of 3 mm. and a length of 5 to 12 mm.

The pellets are placed on perforated plates in a shelf dryer. Predried air is passed over the catalyst at a rate of 600 liters (S.T.P.) per kg. of catalyst per hour. The pieces are heated to 150° C. within twelve hours and kept at this temperature for seven hours. The amount of air is then increased to 800 to 1000 liters (S.T.P.) per kilogram of catalyst per hour and the temperature is raised to 400° C. within six hours. At an air rate of 700 to 800 liters (S.T.P.) per kilogram of catalyst per hour, the catalyst is then heated for three hours at 460° C., kept at this temperature for three hours and then slowly cooled. The surface of the catalyst (determined according to the BET method (see Journal of the American Chemical Society, vol. 60 (1938), pages 309 to 319) is 12.5 m.$^2$/g. The water vapor partial pressure of the air current, cooled to 40° C., which is passed over the catalyst, is 0.01 to 0.02 atmosphere, i.e. from 13.7 to 27.5% of the saturation value at this temperature. The catalyst is charged into a tube reactor provided with circulatory gas heating. It is heated in a current of hydrogen of 25 liters (S.T.P.) per liter of catalyst per hour to 480° C. within three hours and this temperature is maintained for five hours. It is then cooled to 370° C. and the dehydrogenation of cyclohexanol is begun. 1.0 kg. of cyclohexanol is passed per hour over each liter of catalyst. The temperature falls still further in consequence of the dehydrogenation reaction and is kept by heating at 250° C. at the beginning of the reaction zone and a maximum of 350° C. When elimination of hydrogen has commenced, the supply of hydrogen is stopped.

A product which contains 81.5% of cyclohexanone, 17% of cyclohexanol, 0.1 to 0.5% of hydrocarbons and 1% of high boiling point condensation products is obtained by cooling the gaseous reaction mixture.

The activity of the catalyst is unchanged after one year and the temperature at the end of the reaction zone is then 385° C.

*Example 2*

The equivalent amount of 25% caustic soda solution is added to a 1.6-molar aqueous solution of zinc dithionite. The precipitate is filtered off, washed with water, made into a paste in a kneader with an addition of 0.5% of starch, the mixture is kneaded for some time and then shaped in a screw extruder to strings having a diameter of 4 to 6 mm. The strings are cut into cylinders 6 to 10 mm. in length. They are placed on perforated plates in a shelf dryer. Predried air is passed over the catalyst at the rate of 600 liters (S.T.P.) per kg. per hour. The cylinders are heated to 150° C. within five hours and kept at this temperature for three hours. The catalyst is then flushed with nitrogen and then hydrogen in an amount of 800 liters (S.T.P.) per kg. of catalyst per hour is passed over the catalyst, the temperature being raised within six hours to 400° C. The whole is then heated within three hours in a current of hydrogen to 460° C., kept at this temperature for three hours and then cooled slowly. The surface then amounts to 8.2 m.$^2$/g.

Dehydrogenation of cyclohexanol is carried out in the same way as in Example 1. By fractional distillation of the reaction product, 0.1 to 0.5% of first runnings, 81% of cyclohexanone, 17% of cyclohexanol and about 1% of high boiling point products are obtained. The catalyst gives the same results after one year.

*Example 3*

A 5% aqueous zinc nitrate solution is precipitated with an equivalent amount of 25% sodium hydroxide solution. The precipitated zinc hydroxide is filtered off and made into a paste with a starch solution in such a way that the zinc hydroxide contains 3% starch. The composition is then processed into pellets 10 mm. long and 3 mm. in diameter. The pellets are charged to a preheated shaft furnace of 1 m.$^2$ diameter and placed on a grate through which predried air is passed at a rate of 100 m.$^3$ per 100 l. catalyst per hour. The temperature is increased to 400° C. within three hours. After another three hours a temperature of 560° C. is set up in the catalyst zone. This temperature is maintained for two hours, then allowed to fall to 400° C. within three hours and the catalyst is discharged from the furnace and supplied to a dehydrogenation reactor. The surface of the catalyst is 13 m.$^2$/g. The dehydrogenation of the cyclohexanol is carried out in the manner described in Example 1 and 0.1 to 0.5% first runnings, 81% cyclohexanone, 17% cyclohexanol and 1.5% high boiling point products are obtained. The catalyst gives the same results after one year.

We claim:
1. A process for the catalytic dehydrogenation of a cycloalkanol of six to twelve carbon atoms at a temperature of 250° to 450° C. in the gas phase which comprises contacting said cycloalkanol with a catalyst comprising zinc oxide which has been obtained by precipitation of an aqueous zinc salt solution with a basic precipitant, separation of the precipitate from the aqueous phase, heating it within at least two hours to about 400° C. and annealing at a temperature between 400° and 600° C. for two to ten hours, the period of heating and temperature being correlated so that a zinc oxide having a surface area of 5 to 20 m.$^2$/g. is formed.

2. A process as set forth in claim 1 wherein the cycloalkanol is cyclohexanol.

3. A process as set forth in claim 1 wherein the precipitate, after having been separated from the aqueous phase and before it is heated to about 400° C., is formed into suitable shapes.

4. A process as set forth in claim 1 wherein the precipitate is dried in a current of air at 100° to 150° C. prior to heating to 400° C.

5. A process as set forth in claim 1 wherein the heating within at least two hours to about 400° C. is carried out in a current of inert gas.

6. A process as set forth in claim 1 wherein the annealing is carried out in a current of air.

7. A process as set forth in claim 1 wherein the zinc oxide is treated at 300° to 500° C. with hydrogen prior to the dehydrogenation.

8. A process as set forth in claim 1 wherein said catalyst consists essentially of zinc oxide in an amount of at least 80% by weight with reference to the total weight of all catalyst components.

References Cited by the Examiner

UNITED STATES PATENTS

| 1,793,350 | 2/1931 | Bader et al. | 252—475 |
| 1,908,696 | 5/1933 | Dodge | 252—475 |

FOREIGN PATENTS

| 909,227 | 10/1962 | Great Britain. |

LEON ZITVER, *Primary Examiner.*

M. M. JACOB, *Assistant Examiner.*

UNITED STATES PATENT OFFICE
CERTIFICATE OF CORRECTION

Patent No. 3,305,587                          February 21, 1967

Heinrich Sperbert et al.

It is hereby certified that error appears in the above numbered patent requiring correction and that the said Letters Patent should read as corrected below.

Column 2, line 15, for "reciprocating" read -- precipitating --.

Signed and sealed this 7th day of November 1967.

(SEAL)
Attest:

Edward M. Fletcher, Jr.                      EDWARD J. BRENNER
Attesting Officer                             Commissioner of Patents